Nov. 28, 1967   F. J. FUCHS, JR   3,354,792
PRESSURE ACTUATED SEAL
Filed June 3, 1965

INVENTOR
F. J. FUCHS, JR.
BY W. M. Kau
ATTORNEY

United States Patent Office 3,354,792
Patented Nov. 28, 1967

3,354,792
PRESSURE ACTUATED SEAL
Francis Joseph Fuchs, Jr., Princeton Junction, N.J., assignor to Western Electric Company, Incorporated, New York, N.Y., a corporation of New York
Filed June 3, 1965, Ser. No. 461,065
15 Claims. (Cl. 92—174)

ABSTRACT OF THE DISCLOSURE

A pressure actuated seal is provided which includes a body of pressure gelable fluid which thickens or solidifies within the operating range of the apparatus in which the seal is employed. The pressure within the fluid which is being sealed is transmitted (e.g., by being placed in fluid-to-fluid contact) to the body of pressure gelable fluid to cause the pressure gelable fluid to thicken or solidify, and enhance or form a seal.

---

Figure 1:
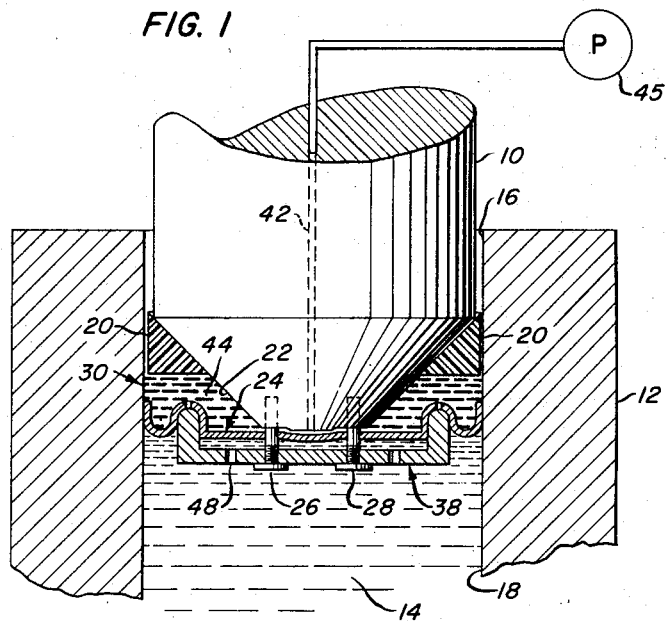

This invention relates to sealing means, and methods of providing the same, for a pair of relatively movable surfaces. More particularly, this invention is directed to a novel, pressure actuated seal, and methods of providing the same, capable of preventing leakage of highly pressurized fluids between a piston and the walls of the chamber in which the piston is disposed.

While not limited thereto in its potential usage, this invention has particular utility in apparatus which relies upon hydrostatic pressures to form or cut materials. In such apparatus, an example of which is described in copending application, Ser. No. 436,128, filed Mar. 1, 1965, entitled, "Ultrahigh Pressure Metal Forming Apparatus," and assigned to the same assignee as the present invention, a piston or ram pressurizes a working fluid contained in a chamber. The billet or piece to be worked is positioned within the chamber in proximity to a die. Thus, the work is subjected to the pressure created in the fluid during the compression stroke of the ram. As is now well known, the ductility of materials increases with application of hydrostatic pressure. However, before this increase in ductility becomes sufficient to facilitate operations such as extrusion or deep drawing, it is necessary to create ultrahigh pressures in the fluid. These pressures may be as high as 500,000 p.s.i., or even higher. In order to employ such pressures on a production basis, it has become necessary to design fatigue-resistant pressure chambers and seals.

In the prior art, seals which prevent leakage of highly pressurized, low-viscosity fluids have been constructed of rubber or plastic materials. However, at pressures on the order of 500,000 p.s.i., these materials rapidly deteriorate from the effects of repeated high-pressure cycles. It has been proposed, in order to overcome the time consuming seal replacement problem caused by such deterioration, to use hardened-metal elements as the sealing means between a piston and wall of a high-pressure chamber. Metal seals are not as effective in preventing escape of thin fluids as are rubber or plastic seals. Thus, use of metal seals precipitates a leakage problem which in turn can be overcome only by resort to using relatively viscous forming fluids. Since these relatively viscous fluids solidify at lower pressures than are required for many ultrahigh pressure forming operations, use thereof in the forming chamber is not a practical solution to the problem of providing a high-pressure seal having a reasonably long service life when subjected to repeated cycles during which the pressure may reach 500,000 p.s.i.

This invention overcomes the above-stated problems by providing a pressure actuated seal.

It is, therefore, an object of this invention to provide an improved high-pressure seal.

It is another object of this invention to prevent leakage of highly pressurized fluids.

It is yet another object of this invention to provide a seal between relatively movable members.

It is also an object of this invention to provide a high-pressure seal having a longer service life than those presently available.

It is a further object of this invention to provide a seal for a hydrostatic forming or cutting apparatus.

These and other objects of this invention are accomplished by defining a chamber or cavity between a member and the wall of a vessel through which the member extends. A pressure gelable fluid is supplied to the cavity. As the pressure within the vessel increases, the gelable fluid is also pressurized. The fluid in the cavity thus becomes less mobile as vessel pressure increases and, since this thickened fluid conforms to the shape of the cavity, the seal between the member and vessel wall is enhanced thereby.

Figure 2:
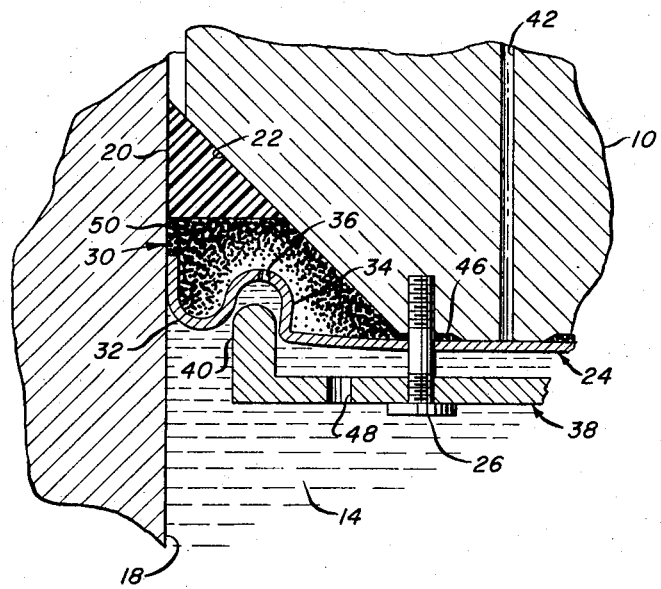

This invention may be better understood and its numerous advantages will become apparent to those skilled in the art by reference to the accompanying drawing in which like reference numerals refer to like elements in both figures and in which:

FIGURE 1 depicts a novel seal in accordance with this invention employed in a typical environment; and FIGURE 2 is a partial view of the seal of FIGURE 1 as it appears under pressure.

Referring now to FIGURE 1, there is shown a partial view of a hydrostatic forming apparatus employing a specific embodiment of the improved high pressure seal of this invention. This forming apparatus comprises a ram or piston 10 disposed for movement within a pressure vessel or forming chamber 12 in such a manner as to pressurize a thin forming fluid 14 which may, for example, be a low viscosity hydrocarbon such as pentane or a mixture of normal pentane and isopentane. For a description of the remaining elements which constitute a hydrostatic forming apparatus, reference may be had to above-mentioned copending application Ser. No. 436,128. The high-pressure seal of this invention will be described in connection with the prevention of leakage of fluid 14 past ram 10 through the clearance 16 between the ram and the inner wall 18 of vessel 12. However, it is to be understood that the instant invention is not limited in its utility to the above-described environment.

For the purpose of mating with a main sealing element 20, the end of ram 10 is machined so as to present a tapered surface 22. Element 20, which may for example be an annular beryllium-copper member, has a complementary internal taper. As can be seen most clearly from FIGURE 2, movement of ram 10 to pressurize or compress fluid 14 will cause element 20 to move in the opposite direction. That is, element 20 responds to pressurization of fluid 14 due to movement of ram 10 into vessel 12 by expanding slightly and sliding on surface 22 until it contacts wall 18. Element 20 thus serves to seal off clearance 16. Because of its composition, element 20 will slide on wall 18 and thus movement of ram 10 is not seriously inhibited thereby. However, because of surface imperfections which are always present, leakage of fluid 14 from vessel 12 past element 20 will occur when fluid 14 is pressurized.

In order to enhance the sealing action provided by element 20, an additional sealing means is provided between element 20 and fluid 14. This additional seal, which is pressure actuated, is formed by mounting a thin, circular, hardened-steel wiper element 24 adjacent the free end of ram 10. Wiper element 24 is loosely supported by a pair of bolts 26, 28. Due to its composition and shape, wiper element 24 is resilient and thus may be caused to flex. This resiliency coupled with its mode of mounting makes the center portion of element 24 capable of slight axial movement relative to ram 10.

As will be apparent from FIGURES 1 and 2, an annular cavity or chamber, indicated generally at 30, is defined by element 24, wall 18, element 20 and tapered surface 22 of ram 10. The outer edge of element 24 is retroflexed, as shown at 32, in a direction opposite to the direction of travel of ram 10 when applying pressure to forming fluid 14. Adjacent to the retroflexed portion thereof, the wiper element is formed into an annular channel 34 having a plurality of fluid passages or apertures 36 at the bottom thereof. The purpose of these passages, which may be seen best from FIGURE 2, will be explained below.

Positioned in front of wiper element 24 is a backup plate 38 which, unlike the wiper element, is inflexible. Plate 38 is of smaller diameter than element 24 and is formed with an inwardly projecting edge 40 thereon which cooperates with channel 34 in element 24. As shown in FIGURE 1, when fluid 14 is in an unpressurized state, apertures 36 are closed to fluid 14 by projection 40. Apertures 36 will remain closed until a sufficient pressure differential is established across wiper element 24 to cause generally upward bending or flexing thereof. That is, the creation of sufficient pressure in fluid 14 causes flexing of the wiper element which results in the outer extremities thereof moving generally toward ram 10 with the accompanying opening of apertures 36 to fluid 14.

Ram 10 is provided with an internal bore 42 which serves as a fluid supply passageway. In the manner to be described below, a pressure gelable fluid 44 is supplied to cavity 30 via bore 42. To find utility in the seal of this invention, fluid 44 should preferably be possessed of certain desirable characteristics. For example, fluid 44 should solidify within the operating pressure range of the apparatus employing the seal. Also, fluid 44 should possess some lubricity when solidified and should exhibit relative abrupt solidification at a particular pressure. Thus, fluid 44 may, for example, be n-heptane oil that solidifies at 163,000 p.s.i., a silicon oil such as Dow-Corning Fluid #200 or a 90-weight grease. Fluid 44 is forced through bore 42 to cavity 30 from an external source, not shown, by a pump 45 which is preferably capable of developing a pressure of 2,000 p.s.i.

Wiper element 24 normally butts against the end of ram 10 and closes off bore 42. However, element 24 will flex or bend at approximately 1,000 p.s.i. Thus, the pumping of fluid 44 through bore 42 will cause wiper element 24 to bend and assume the shape shown in FIGURE 1. This pressure induced distortion of the center portion of element 24 permits the pressure gelable fluid to enter and fill cavity 30. As can be seen most clearly from FIGURE 2, the end of ram 10 is machined to provide a recessed portion 46 surrounding the raised center portion through which bore 42 passes. Portion 46 insures that the wiper element, when bent by the pressure exerted by fluid 44, will not contact the end of ram 10 at the termination of tapered surface 22 thereby preventing passage of the gelable fluid into cavity 30.

In operation, as the ram descends, and the pressure exerted by fluid 14 exceeds that established in fluid 44 by its supply pump, wiper element 24 is again urged against the end of ram 10 so as to close bore 42 and prevent the escape of sealing fluid 44 back up the bore. In order to facilitate the reclosing of bore 42, a plurality of holes 48 are provided in backup plate 38. Holes 48 permit fluid 14 to act directly on the center portion of wiper element 24. The urging of element 24 against the end of ram 10 traps the previously supplied pressure gelable fluid in annular cavity 30. As chamber pressure continues to increase, fluid 14 causes wiper element to bend away from backup plate 38, as shown in FIGURE 2, thereby opening apertures 36. Opening of apertures 36 permits fluid 14 to pass therethrough and to force the trapped pressure gelable fluid 44 outwardly toward wall 18 of vessel 12. The working fluid 14 thus confines some of gelable fluid 44 in the retroflexed portion 32 of wiper element 24 and forms it into a shape similar to that of the wiper element. As will be obvious to those skilled in the art, this substantially U-shaped configuration is often assumed by prior art high pressure seals comprised of rubber or plastic materials. Simultaneously, main sealing element 20 is forced axially of ram 10 to close off clearance 16. Since the pressure in the main chamber exceeds that between the wiper element and ram at the time apertures 36 are opened, fluid 44 cannot escape through apertures 36. Further increases in pressure within chamber 12 will be transmitted by fluid 14 to fluid 44 which solidifies into a solid mass 50, as shown in FIGURE 2. The solidified sealing fluid conforms to seal 20, surface 22, wall 18 and, generally, to wiper element 24, and thus forms a substantially perfect fitting, high-pressure seal. As may be seen from FIGURE 2, some of fluid 14 is inside of cavity 30 adjacent portion 34 of wiper element 24 when fluid 44 solidifies. Upon return of ram 10 to its initial position thereby releasing the pressure in vessel 12, wiper element 24 returns to its initial position and solid mass 50 returns to its original liquid state.

While a preferred embodiment has been shown and described, various modifications of this invention are possible without deviating from the spirit and scope thereof. For example, it is possible to locate the supply means and cavity for the gelable fluid in the wall of the cylinder thereby eliminating the flexible wiper element. Accordingly, it is to be understood that this invention has been described by way of illustration rather than limitation.

What is claimed is:

1. A seal for preventing leakage of fluid, pressurized to a relatively high pressure level, from a first region to a second relatively low pressure region comprising:
  a first member for spanning an opening to be sealed;
  means defining a chamber positioned adjacent said first member on the side thereto toward the first region; and
  a pressure gelable fluid in said chamber which pressure gelable fluid thickens at a pressure lower than said relatively high pressure, a pressure differential across the chamber causing said gelable fluid to conform to the shape of the chamber and to solidify thereby enhancing the seal provided by said first member.

2. A seal for preventing leakage of a highly pressurized fluid from a vessel in which it is confined about a member which passes through the wall of the vessel comprising:
  a first sealing means for providing a partial seal between the vessel wall and member;
  means cooperating with the vessel wall, member and first sealing means to define a chamber positioned interiorly of said first sealing means; and
  a pressure gelable fluid in said chamber which pressure gelable fluid becomes less mobile at a pressure level less than the pressure level to which said highly pressurized fluid is pressurized, the pressure differential across the chamber causing said gelable fluid to conform to the space to be sealed and to solidify thus enhancing the seal provided by said first sealing means.

3. A pressure actuated seal for a movable member employed in a fluid utilizing apparatus having a certain operating pressure range, comprising:
  means coacting with the movable member for providing a first seal between said member and an adjacent surface of a stationary body;
  means cooperating with the movable member, first seal means and body to define a chamber, said chamber defining means being coaxial with the movable member and displaced from said first seal means; and
  a pressure gelable fluid disposed in said chamber which pressure gelable fluid decreases in mobility within the operating pressure range of said apparatus, relative movement between the member and body causing pressurization and solidification of the gelable fluid thereby enhancing the seal between the body and member.

4. A pressure actuated seal for a piston comprising:
first sealing means coaxial with the piston for providing a substantially fluid tight sliding seal between the piston and a cylinder wall;
a resilient wiper member coaxial with the piston and displaced from said first sealing means, said wiper member contacting the wall of the cylinder and cooperating with said first sealing means to form a chamber therebetween;
a pressure gelable fluid disposed in said chamber; and
means for transmitting pressure created within the cylinder to said gelable fluid so that said fluid will become pressurized and solidified when cylinder pressure increases and the seal between the cylinder wall and piston will be enhanced.

5. A pressure actuated seal for a piston, comprising:
means coacting with the piston to provide a first seal between the piston and a cylinder wall;
a wiper member coaxial with the piston, said wiper member making contact with the piston and cylinder wall downstream of said first seal means in the direction of piston travel during compression; and
a pressure gelable fluid disposed in the region between said wiper member and first seal means, an increase in pressure in the cylinder causing movement of said wiper member generally toward said first sealing means and pressurization and solidification of said gelable fluid thereby enhancing the seal between the piston and cylinder wall.

6. A pressure actuated seal for a piston having a certain operating pressure range, comprising:
first sealing means coaxial with the piston for providing a substantially fluid tight sliding seal between the piston and the wall of the cylinder in which the piston is disposed;
a resilient wiper member coaxial with the piston and normally displaced from said first sealing means, said wiper member contacting the piston and the wall of the cylinder in front of said first sealing means and cooperating with said first sealing means to form a chamber therebetween; and
a pressure gelable fluid in said chamber and which pressure gelable fluid solidifies within the operating pressure range of said piston.

7. In an apparatus for creating high-pressures in a fluid and which apparatus has a certain operating pressure range, said apparatus including a pressure vessel and a ram, at least a portion of said ram extending into said vessel and being movable therein for pressurizing vessel fluid, the improvement comprising:
first sealing means movable and coaxial with the ram for providing a sliding seal between the ram and the vessel wall;
a resilient wiper member;
means mounting said resilient wiper member coaxially with the ram and spacially displaced from said first sealing means, a chamber being thus formed between said first sealing means and said wiper member; and
means for supplying a pressure gelable fluid to said chamber, said pressure gelable fluid solidifying within the operating pressure range of said apparatus.

8. Pressure actuated sealing means for a piston, comprising:
first sealing means coaxial with the piston for providing a substantially fluid tight sliding seal between the piston and the wall of the cylinder in which the piston is disposed;
a resilient wiper member coaxial with the piston and normally displaced from said first sealing means, said wiper member contacting the piston and wall of the cylinder and cooperating with said first sealing means to form a chamber therebetween;
means including a passageway in the piston for supplying a pressure gelable fluid to said chamber; and
means permitting movement of said wiper member generally toward said first sealing means in response to increased pressure within the cylinder, said fluid supply passageway being closed and the fluid trapped in said chamber by such movement, said trapped fluid being pressurized and thus solidified when cylinder pressure increases thereby enhancing the seal between the cylinder wall and piston.

9. In an apparatus for creating high-pressures in a fluid, said apparatus including a vessel and a ram for pressurizing fluid within said vessel, the improvement comprising:
first sealing means coaxial with the ram for providing a sliding seal between the ram and vessel wall;
a resilient wiper member coaxial with the ram, said wiper member normally contacting the end of the ram and the wall of the vessel and cooperating with said first sealing means to form an annular chamber therebetween;
means including a fluid supply passageway in the ram for supplying a pressure gelable fluid to said chamber, passage of fluid through said passageway causing bending of said wiper member away from the end of the ram so that said fluid may enter said chamber; and
means supporting said wiper member such that it is capable of moving generally toward the end of said ram and said first sealing means in response to increased pressure within the vessel, said wiper element contacting the end of the ram and closing said fluid supply passageway upon pressurization of the vessel fluid, the gelable fluid thus being trapped in the annular chamber, said trapped fluid being pressurized and solidified thus enhancing the seal between said ram and vessel wall.

10. In an apparatus for creating high pressures in a fluid, said apparatus including a pressure vessel and a ram, at least a portion of said ram extending into said vessel and being movable therein for pressurizing vessel fluid, the improvement comprising:
first sealing means movable and coaxial with the ram for providing a sliding seal between the ram and the vessel wall;
a resilient wiper member having a plurality of ports therein for passage of vessel fluid therethrough;
means mounting said resilient wiper member coaxially with and normally contacting the end of the ram, an annular chamber being thus formed between said first sealing means and said wiper member;
means including a fluid supply passageway in the ram for supplying a pressure gelable fluid to said chamber; and
means for sealing the ports in said wiper member when said vessel fluid is unpressurized, pressurization of the vessel fluid by said ram causing displacement of said wiper element from said means to seal the ports therein so that the vessel fluid may act upon said pressure gelable fluid to cause the latter to conform to the chamber shape and solidify thus enhancing the seal between the ram and vessel walls.

11. A seal for preventing the passage of fluid past a small opening in a pressure vessel having a certain operating pressure range, comprising:
a diaphragm defining a cavity which spans the opening, and
a pressure gelable medium within the cavity and which pressure gelable medium solidifies within the operating pressure range of said pressure vessel.

12. A seal for preventing passage of fluid past a ram within a cylinder having a certain operating pressure range, comprising:
a diaphragm defining a cavity bounded by the ram, the cylinder, and the diaphragm; and a pressure gelable medium within the cavity and which pressure gelable medium solidifies within the operating pressure range of said cylinder.

13. A pressure actuated seal for preventing leakage of pressurized fluid between a member and the walls of the vessel in which the member is disposed and in which vessel the pressurized fluid is contained, which comprises:
    means for providing a chamber around said member and for receiving a body of pressure gelable fluid,
    a body of pressure gelable fluid disposed in said chamber, and
    means for admitting a portion of said pressurized fluid into said chamber and into direct fluid contact with said pressure gelable fluid to cause said pressure gelable fluid to solidify and form a seal around said member.

14. A pressure actuated seal for a member movable into a vessel filled with a working fluid which comprises:
    first sealing means for providing a substantially fluid-tight sliding seal between the movable member and the vessel;
    means for providing, in cooperation with said movable member, said vessel and said first sealing means, a chamber for receiving a pressure gelable fluid; and
    said means upon the pressurization of said working fluid, for admitting a portion of said pressurized fluid into said chamber and into direct fluid contact with said pressure gelable fluid to cause said gelable fluid to solidify and enhance the sealing action of said first sealing means.

15. A pressure actuated seal for a piston movable into a pressure vessel to pressurize a thin fluid disposed therein, which comprises:
    first sealing means coaxial with the piston and for providing a substantially fluid-tight sliding seal between the piston and the pressure vessel;
    means for providing, in cooperation with said movable piston and said first sealing means, a chamber for receiving a pressure gelable fluid;
    a pressure gelable fluid disposed in said chamber;
    said pressure gelable fluid being solidifyable at a pressure lower than that to which the thin fluid is to be pressurized; and
    said means, upon movement of said piston into said vessel to pressurize said thin fluid, for admitting a portion of said pressurized thin fluid into said chamber and into direct fluid contact with said pressure gelable fluid to cause said pressure gelable fluid to solidify and conform to said first sealing means, said piston, and said vessel and form a substantially perfect fitting, a high-pressure seal around said piston.

References Cited
UNITED STATES PATENTS

| | | | |
|---|---|---|---|
| 1,694,859 | 12/1928 | Laugaudin | 92—174 |
| 2,211,456 | 8/1940 | Caldwell | 92—174 |
| 2,349,253 | 5/1944 | Edmund | 92—174 X |
| 3,062,600 | 11/1962 | Zehner | 92—174 X |
| 3,117,792 | 1/1964 | Glenn | 277—135 X |
| 3,204,858 | 9/1965 | Dros | 92—174 X |

MARTIN P. SCHWADRON, *Primary Examiner.*

G. N. BAUM, *Assistant Examiner.*